US006932351B1

(12) United States Patent
Mowll

(10) Patent No.: US 6,932,351 B1
(45) Date of Patent: Aug. 23, 2005

(54) PACKING CASE FOR COOLING COMPRESSORS AND OTHER MACHINERY

(76) Inventor: William L. Mowll, 18 Julie Dr., Ormond Beach, FL (US) 32176

( * ) Notice: Subject to any disclaimer, the term of this patent is extended or adjusted under 35 U.S.C. 154(b) by 69 days.

(21) Appl. No.: 10/361,072

(22) Filed: Feb. 7, 2003

(51) Int. Cl.$^7$ ................................................ F16J 15/26
(52) U.S. Cl. ...................... 277/512; 277/517; 277/930
(58) Field of Search ................ 277/512, 513, 277/515, 517, 518, 930

(56) References Cited

U.S. PATENT DOCUMENTS

| | | | | |
|---|---|---|---|---|
| 846,283 | A | * | 3/1907 | Cook ........................ 277/545 |
| 1,003,162 | A | * | 9/1911 | Thiel ......................... 277/545 |
| 1,504,342 | A | * | 8/1924 | Hauber ...................... 277/510 |
| 1,699,135 | A | * | 1/1929 | Cronin ....................... 277/491 |
| 1,879,855 | A | * | 9/1932 | Morton ...................... 277/514 |
| 1,927,507 | A | * | 9/1933 | Sommers et al. ........... 277/515 |
| 2,586,871 | A | * | 2/1952 | Shields ....................... 277/515 |
| 2,663,580 | A | * | 12/1953 | Shirk .......................... 285/41 |
| 3,048,411 | A | | 8/1962 | Waibel ........................ 277/74 |
| 3,147,982 | A | * | 9/1964 | Klein .......................... 277/515 |
| 3,357,706 | A | | 12/1967 | Wilkinson .................... 277/15 |
| 3,544,118 | A | | 12/1970 | Klein .......................... 277/27 |
| 4,093,239 | A | * | 6/1978 | Sugahara .................... 277/514 |
| 4,545,585 | A | * | 10/1985 | Buse .......................... 277/431 |
| 4,657,264 | A | * | 4/1987 | Wehber ...................... 277/533 |
| 5,421,892 | A | * | 6/1995 | Miyagi ....................... 118/724 |
| 5,540,449 | A | | 7/1996 | Algers et al. ................ 277/65 |
| 5,873,575 | A | | 2/1999 | Hanlon ....................... 277/512 |

* cited by examiner

Primary Examiner—Alison K. Pickard
(74) Attorney, Agent, or Firm—Geoffrey K. Gavin; Dean W. Russell; Kilpatrick Stockton LLP

(57) ABSTRACT

A packing case for cooling compressors and other machinery is disclosed. A packing case includes an opening through which a movable machinery shaft may be inserted such that the packing case is mounted on the shaft. In an exemplary embodiment, the packing case contains at least one packing cup with channels through which a fluid coolant may flow. The channels form substantially parallel passageways along the length of the shaft that are spaced apart around the shaft circumference and series connected. The fluid coolant may be introduced through one or more inlet ports, circulate through the substantially parallel passageways of the at least one packing cup, and exit the packing case through one or more outlet ports. The fluid coolant may flow through the packing case in a single, continuous flow path or a split flow arrangement.

16 Claims, 7 Drawing Sheets

PACKING CASE FOR COOLING COMPRESSORS AND OTHER MACHINERY

FIELD OF THE INVENTION

This invention relates generally to improvements in packing cases for cooling compressors and other machinery and more specifically to improvements in the coolant circulation structure of such cases.

BACKGROUND OF THE INVENTION

Generally, packing cases are used to provide a seal along and around a movable piston rod of a gas compressor to prevent the escape of gas from the piston cylinder along and around the surface of the piston rod. Packing cases are also used to provide gas tight seals along and around the movable shafts of other rotating machinery. A packing case member or packing cup is typically cylindrically shaped and contains a central circular opening for stationary mounting in a compressor housing on a reciprocally movable piston rod. The central opening has a slightly larger diameter than that of the piston rod preventing the piston rod from rubbing against the cup as the piston rod reciprocates. The series of cups forming the packing case contains seal rings which slidably bear against the rod to provide a gas tight barrier.

The seal rings cause sliding friction to occur along the piston rod as the piston rod moves through the rings. This friction causes heating of the packing cups. To reduce heating in a lubricated compressor, liquid lubricants are typically introduced through a channel or opening in the packing case to the surface of the piston rod to reduce the sliding friction. In non-lubricated compressors, no liquid lubricant is used. Liquid coolants are introduced into passageways in the packing cups housing to absorb heat from the packing case.

One existing packing case utilizes cylindrically-shaped cups that are cast in two mating cylindrically-shaped pieces. A circular groove is machined into opposing surface portions of the mating faces of the pieces so that, when they are joined, a circular passageway is formed in the cup housing which extends around a majority peripheral portion of the central opening. One end of the passageway contains an inlet port which opens onto one flat face of the cup, while the opposite end portion of the passageway contains an outlet port which opens onto an opposite flat face of the cup. A fluid coolant introduced into the circular passageway flows between the inlet and outlet ports.

Typically, a single inlet line carrying liquid coolant is connected to each inlet port in the series of cups making up a packing case. Similarly, a single outlet line collects the coolant circulated through each cup and is connected to each of the outlet ports of each of the cups. This arrangement is called parallel flow and has the disadvantage that the passageways of one or more cups can become clogged, producing increased heating in the clogged cup or cups without it becoming immediately apparent to operators of the compressor. Because they are formed of two mated pieces, it is necessary to completely remove them from the piston rod and break them apart in order to clean the individual grooves forming the circular coolant passageways.

Another existing packing case includes a series of packing case members having separate coolant passageways that are successively linked together to form a series flow path for coolant circulating through the packing case. Each packing cup includes a housing defining a hollow passageway surrounding a majority peripheral portion of the central opening to form a path for the flow of a fluid coolant around the circular opening between a fluid inlet port and a fluid outlet port located on opposite end portions of the passageway. The inlet port and outlet port open onto an outer surface of the cup housing. The passageway is formed by a series of hollow, straight-line segments successively intersecting one another at different angular positions around the circular opening between the inlet port and the outlet port. Each of the straight-line segments includes an end portion extending to a different access opening located on at least one outer surface of the housing.

Existing packing cases assist with providing a seal for movable machinery shafts and transferring the heat generated by such shafts. As more modern machines are made with movable shafts that have faster speeds and shorter strokes and operate non-lubricated, improved heat transfer becomes increasingly important. Accordingly, there is a need for a packing case for compressors and other machinery that provides improved cooling.

SUMMARY OF THE INVENTION

The present invention provides a packing case for cooling compressors and other machinery. A packing case includes an opening through which a movable machinery shaft may be inserted such that the packing case is mounted on the shaft. Packing cases according to the present invention may include one or a plurality of packing cups, inlet ports, and outlet ports. In an exemplary embodiment, the packing case contains at least one packing cup with channels through which a fluid coolant may flow. The channels form substantially parallel passageways along the length of the shaft that are spaced apart around the shaft circumference and series connected. Entry channels may be arranged such that the passageways form a single, continuous coolant flow path around the circumference of the packing case is used or such that the passageways form a split flow arrangement, meaning that more than one path is used. For example, the flow of liquid coolant may be split in an entry channel such that coolant flows in two separate paths through the substantially parallel passageways around the circumference of the packing case before exiting the packing case. The packing case also includes a flange with one or more inlet and outlet ports. The ports are connected, via channels in the flange, to channels in the at least one packing cup such that the fluid coolant may be introduced through the one or more inlet, circulate through the substantially parallel passageways of the at least one packing cup (either in a single or split flow path), and exit the packing case through the one or more outlets.

In another exemplary embodiment, a packing case for mounting on a shaft includes a plurality of packing cups. Each packing cup includes channels through which a fluid coolant may flow and that are connected to channels of adjacent packing cups to form substantially parallel passageways along the length of the shaft that are spaced apart around the shaft circumference and series connected. A flange includes at least one inlet port connected to a first channel of the flange and at least one outlet port connected to a second channel of the flange. The first and second channels of the flange are connected to separate channels of an adjacent packing cup of the plurality of packing cups such that the fluid coolant may be introduced through the at least one inlet port, circulate through the substantially parallel passageways of the plurality of packing cups, and exit the packing case through the at least one outlet port.

In an embodiment of this invention including a plurality of packing cups, a nose cup and an end cup may be included. Channels of the nose and end cups form circumferential passageways that series connect the substantially parallel passageways of the packing case. The end cup is adjacent the flange such that each of the first and second channels of the flange connect to separate channels of the end cup.

According to certain exemplary embodiments of the present invention, o-rings may be disposed between two packing cups or a packing cup and a flange where channels of each of the plurality of packing cups and the flange connect. A packing cup may have an annular shape and include an outer portion that is longer than an inner portion, forming an annular recess for receiving one or more seal rings or heat transfer rings. Channels in a packing cup may be located only within the outer portion of the packing cup.

A plurality of seal rings may be disposed around the surface of the shaft and in the annular recess of a packing cup, according to certain exemplary embodiments of this invention. Alternatively, a plurality of heat transfer rings may be disposed around the surface of the shaft and in the annular recess of a packing cup such that a set of heat transfer rings disposed within the annular recess contacts both surfaces of the annular recess and a surface of an adjacent packing cup or flange. A set of heat transfer rings disposed within an annular recess of a packing cup includes at least one solid or cut ring and at least one segmental ring in alternating contact with each other.

DETAILED DESCRIPTION OF THE INVENTION

Figure 1:
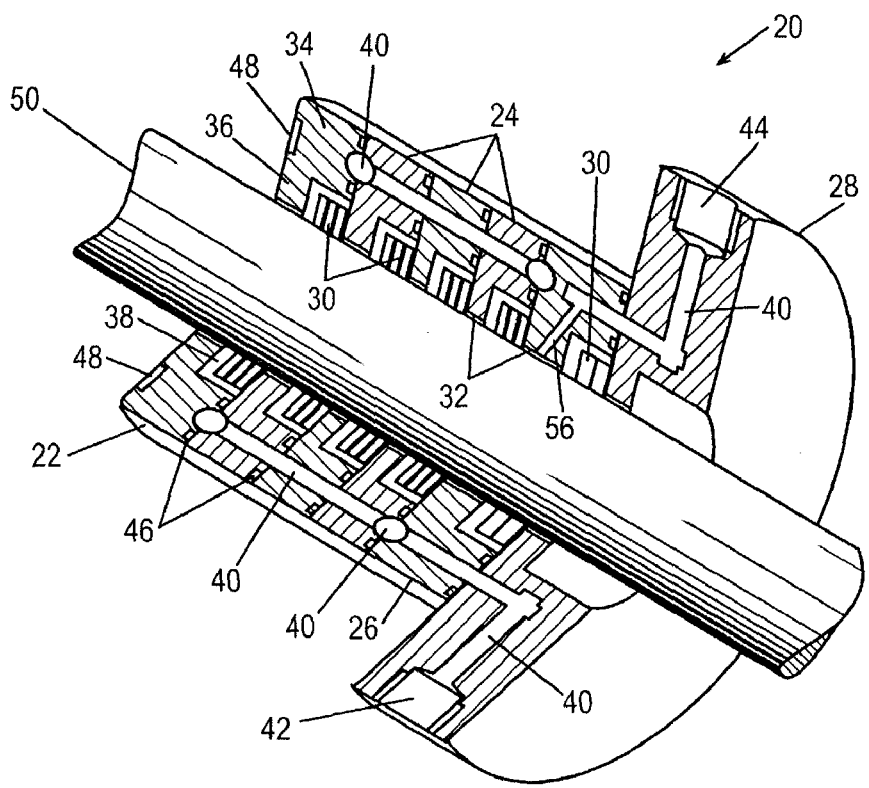
FIG. 1 shows a perspective view of a fragmented packing case containing a series of packing cups disposed on a piston rod of a compressor.
Figure 7:
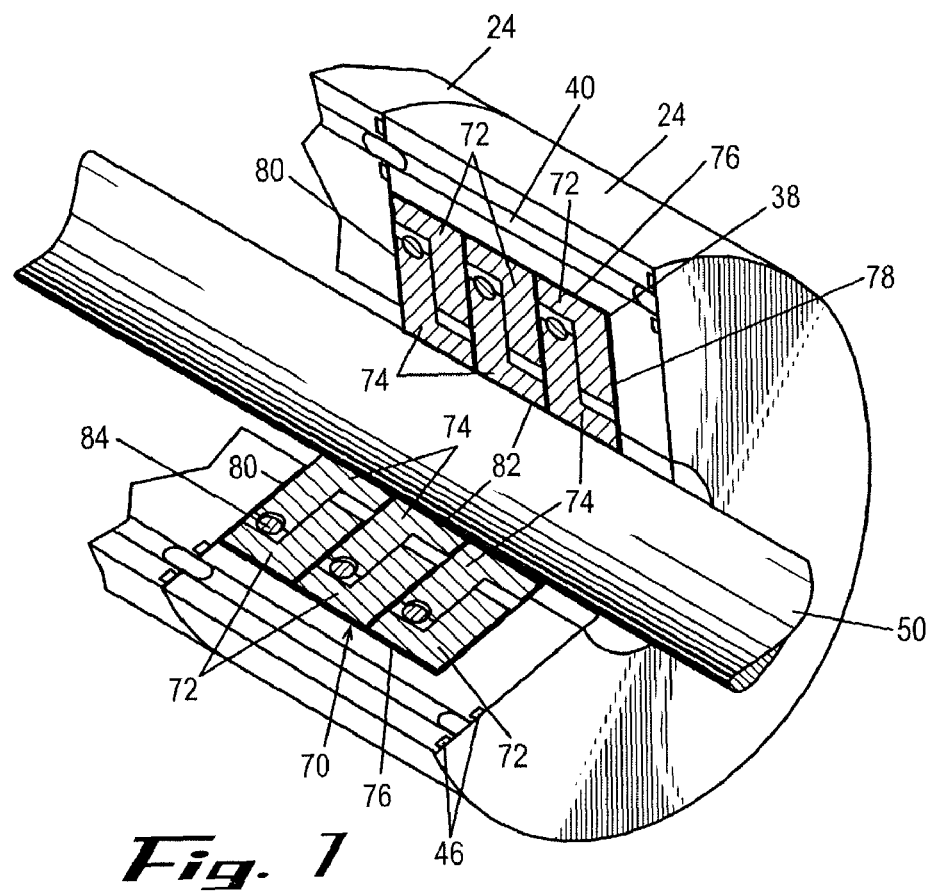
FIG. 7 shows a perspective view of a fragmented packing case containing a series of packing cups and heat transfer rings disposed on a piston rod of a compressor.
Figure 9:
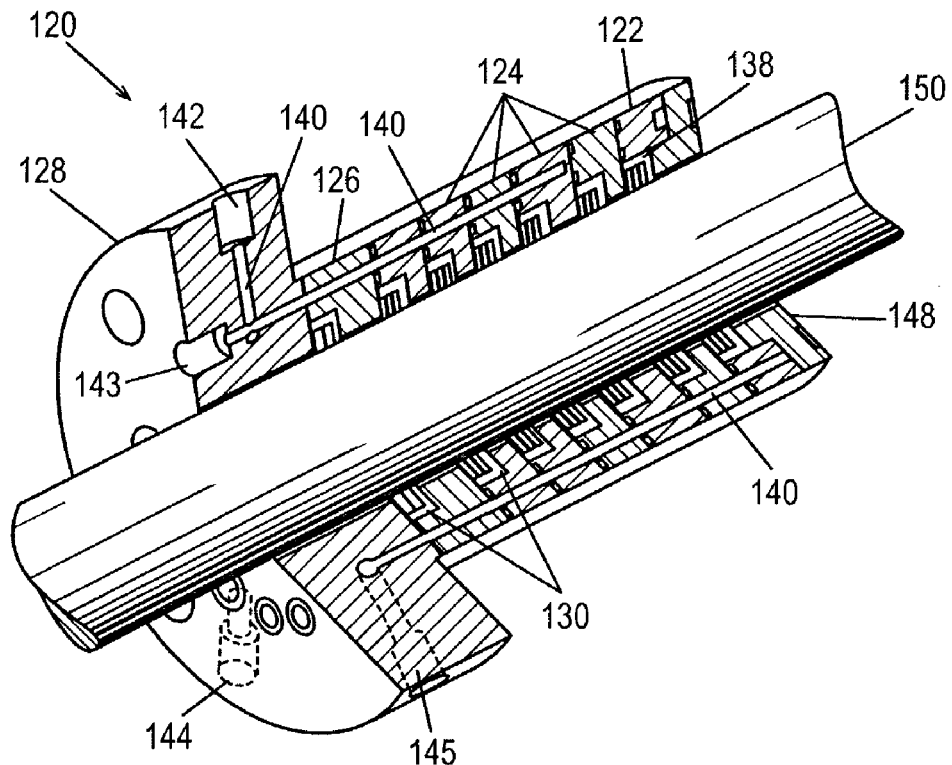
FIG. 9 shows a perspective view of a fragmented packing case, containing a series of packing cups and two inlet and outlet ports, disposed on a piston rod of a compressor.

Referring now to the drawings, an exemplary embodiment of a packing case according to the present invention is shown in FIG. 1. A packing case 20 is disposed on a movable machinery shaft or piston rod 50, such as either a rotating shaft or a reciprocally movable piston rod of a conventional compressor. Packing case 20 includes a nose cup 22, a series of three cups 24, an end cup 26, and a flange 28. Cups 22, 24, and 26 and flange 28 may be constructed of steel, cast iron, bronze, or other suitable materials provided that the material meets the chemical resistance and mechanical strength requirements for a particular application, as well understood by those skilled in the art. Also understood by those skilled in the art is that the number of packing cups contained in any given packing case is a matter of conventional design choice. A packing case according to this invention may include a single packing cup designed in accordance with principles of this invention or a plurality of packing cups, as shown in FIGS. 1, 7, and 9.

Conventional seal rings 30 are disposed around the surface of piston rod 50. Seal rings 30 rub against rod 50 as rod 50 moves, and seal rings 30 form a seal to prevent gases from escaping along rod 50 or through openings 32 between cups 22, 24, and 26 and rod 50. Each cup 22, 24, and 26 has an annular shape and includes an outer portion 34 that is longer than an inner portion 36, which defines an annular recess 38. Annular recesses 38 receive seal rings 30. Typically, conventional seal rings 30 contact the surface of rod 50 and the surface of an adjacent packing cup or flange, as shown in FIG. 1, and may or may not contact the two surfaces of annular recess 38.

Seal rings 30 may be constructed from a wide variety of materials, including bronze, cast iron, various plastics or metal alloys, and the like. In the embodiment shown in FIG. 1, three seal rings 30 are used between cups 22, 24, and 26 and two seal rings 30 are used between end cup 26 and flange 28. The three seal ring configurations may include a conventional radial-tangent pair with backup ring and the two seal ring configuration may include a tangent—tangent pair, both of which configurations are well known to those skilled in the art. Numerous other acceptable seal ring configurations may be used, as well understood by those skilled in the art. In an alternative embodiment, heat transfer rings according to the present invention may be used rather than conventional seal rings. This is described in more detail below with reference to FIGS. 7 and 8.

Figure 2:
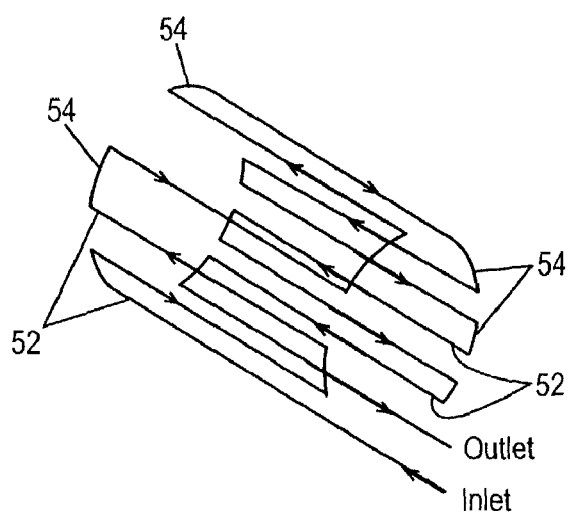
FIG. 2 shows a flow pattern for a fluid coolant circulated through the packing case shown in FIG. 1.

Coolant channels 40 of each of cups 22, 24 and 26 and flange 28 provide a beneficial flow pattern for a liquid coolant to circulate through packing case 20 to assist absorbing heat from packing case 20 and cooling piston rod 50. FIG. 2 schematically illustrates the coolant flow pattern between cups 22, 24, and 26 of packing case 20 from an inlet port 42 in flange 28 to an outlet port 44 in flange 28. As coolant enters packing case 20 through inlet port 42, the coolant flows through a channel 40 in flange 28 and a portion of channels 40 of cups 26, 24, and 22 to the opposite end of packing case 20 as shown. The coolant then flows back through cups 24 to end cup 26, before flowing again to the opposite end of packing case 20. This flow pattern continues around the entire circumference of packing case 20 until the coolant reaches outlet port 44 and exits packing case 20. The fluid coolant circulating through channels 40 absorbs heat from the bodies of the cups of packing case 20 caused by rod 50 as it rubs against seal rings 30.

As shown in FIG. 2, the coolant flows in what may be described as substantially parallel passageways 52 along the length of the rod, substantially parallel passageways 52 being spaced apart around the circumference of the rod and series connected. Substantially parallel passageways 52 are formed by channels 40 in each packing cup that are connected to channels 40 of adjacent packing cups. The coolant circulates from one of substantially parallel passageways 52 to another of substantially parallel passageways 52 via the series connection provided by circumferential passageways 54, as shown in FIG. 2. In the embodiment shown in FIG. 1, circumferential passageways 54 are formed by channels 40 in nose cup 22 and end cup 26. The flow pattern shown in FIGS. 1 and 2 is advantageous because it cools every cup in the packing case. Additionally, the multiple turns of the flow pattern creates added turbulence in the flow, which also assists in cooling rod 50 by increasing the heat transfer from rod 50 to the cups of packing case 20. While FIG. 2 illustrates a single, continuous flow path through the series-connected substantially parallel passageways of the packing case, it should be understood that split flow arrangements, as further described below with reference to FIGS. 9 and 10, may also be used.

As shown in FIG. 1, channels 40 are located in outer portions 34 of cups 22, 24, and 26 and not in inner portions 36 of the cups. Because no channels 40 are within inner portions 36 of cups 22, 24, and 26, this allows the length (i.e., the distance along the rod) of the cups of packing case 20 to be reduced. The reduction of this length allows rod 50 to be more exposed to both the compressed gas in the cylinder and the ambient air is it moves or reciprocates out of the packing case or sealing area. As the speed of strokes in piston rods in compressors and other machinery continues to increase, the distance traveled by rods as they reciprocate (i.e., the stroke) continues to decrease. Additionally, the use of non-lubricated machines also generates additional frictional heating. Thus, the importance of shortening the length of the sealing area of the packing case has increased significance in improving heat transfer from the rod.

O-rings 46 are used between adjoining cups of packing case 20 where channels 40 of the cups meet, as shown in FIG. 1. Typically, o-rings 46 may be of the encircling, individual, or kidney-shape designs that are well known to those skilled in the art. O-rings 46 segregate coolant flowing through channels 40 from the remainder of packing case 20. Gaskets 48 are used at the top of nose cup 22. Any suitable gasket may be used for gaskets 48, such as stainless steel spiral wound gaskets or others well known to those skilled in the art. Additional details of packing case 20 are provided below in the description of cups 22, 24, and 26 and flange 28.

Figure 3A:
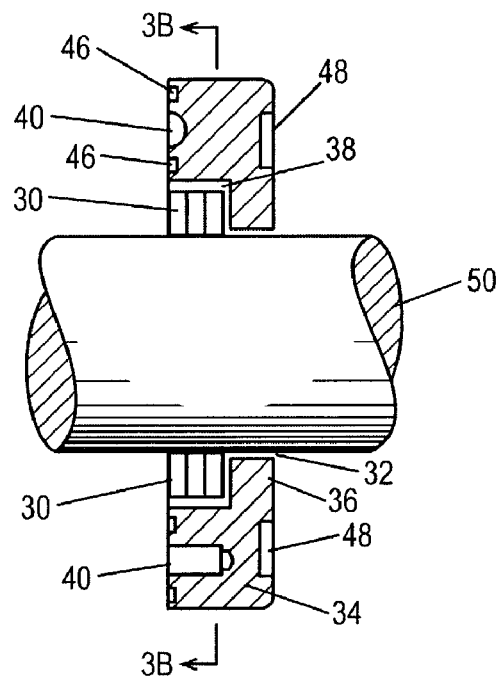
FIG. 3A shows a fragmented peripheral edge view of a nose cup of the packing case of FIG. 1.

Referring now to FIGS. 3A–6B, the cups of the packing case of FIG. 1 are described in more detail. FIGS. 3A and 3B show nose cup 22 of packing case 20. FIG. 3A provides a fragmented peripheral edge view of nose cup 22, and FIG. 3B provides a cross-sectional view of nose cup 22. Nose cup 22 is a disc or annular shape with a circular central opening 32 therethrough. Opening 32 allows nose cup 22 to be loosely and concentrically mounted on a piston rod 50 of a conventional compressor. The diameter of opening 32 should be sufficiently greater than that of rod 50 so that the periphery of the opening is spaced from and does not rub against rod 50 as rod 50 rotates or reciprocates in or through the opening 32.

Nose cup 22, and the packing case of which it is a part, is stationarily mounted so that rod 50 is free to reciprocate back and forth or rotate without touching the peripheral defining wall of opening 32. An annularly extending inner portion 36 of the L-shaped cross-section (see FIG. 3A) of nose cup 22 is formed in and around a surface portion of one end of nose cup 22 in which conventional seal ring 30 is placed to provide a seal as discussed above with reference to FIG. 1.

Figure 3B:
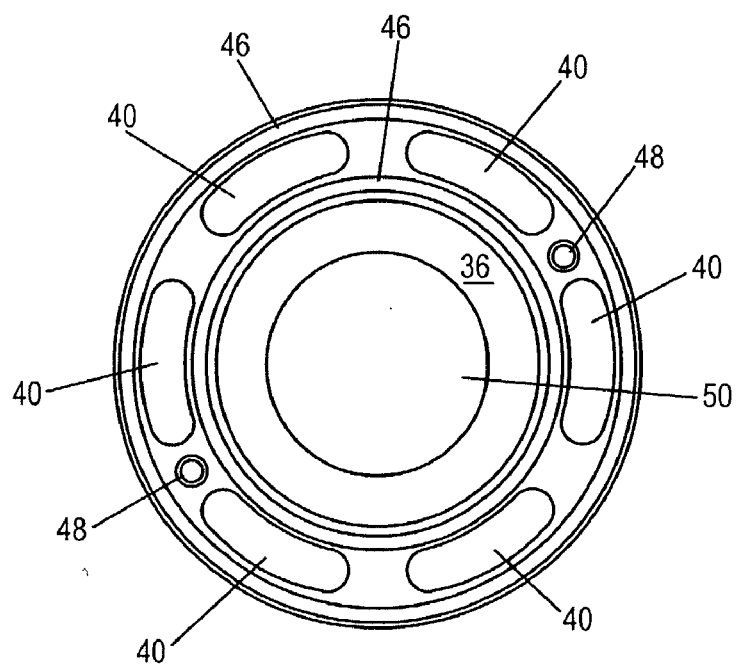
FIG. 3B shows a cross-sectional view of a nose cup of the packing case of FIG. 1 as viewed along cross-section lines 3B—3B of FIG. 3A.

Nose cup 22 includes passageways 40 formed therein. The flow of liquid coolant in packing case 20 and the features thereof were discussed above in connection with FIGS. 1 and 2. As can be seen in FIG. 3B, at least a portion of channels 40 of nose cup 22 are circumferential. In these circumferential portions of channels 40 of nose cup 22, the coolant flowing lengthwise in the substantially parallel passageways within packing case 20 from the flange end of packing case 20 toward the nose cup end of packing case 20 is redirected toward the flange end. Channels 40 are, preferably, circular in cross-section and, intersect with channels 40 of cup 24, as shown in FIG. 1. O-rings 46 provide a seal where channels 40 of nose cup 22 and cup 24 meet. As noted above, the fluid coolant circulating through channels 40 absorbs heat from the body of nose cup 22 caused by rod 50 as rod 50 rubs against seal ring 30.

Figure 4A:
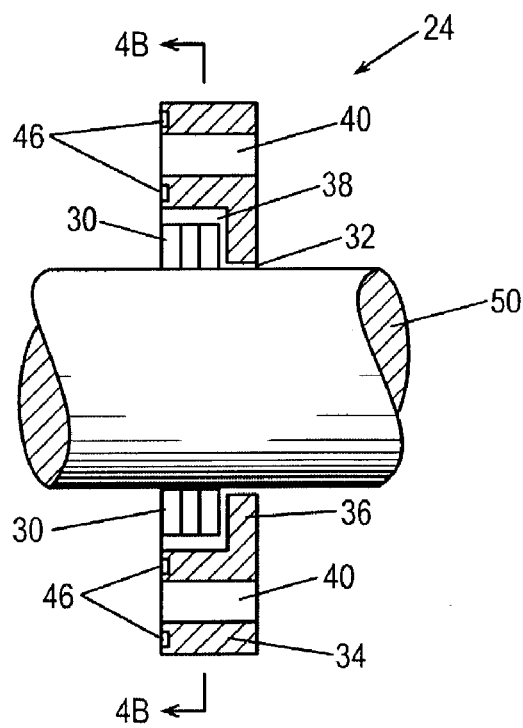
FIG. 4A shows a fragmented peripheral edge view of a cup of the packing case of FIG. 1.
Figure 4B:
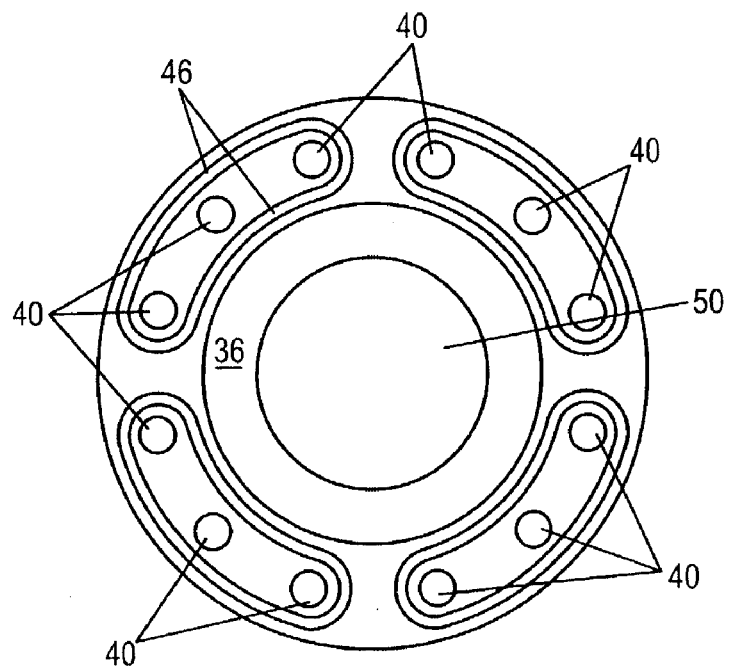
FIG. 4B shows a cross-sectional view of a cup of the packing case of FIG. 1 as viewed along cross-section lines 4B—4B of FIG. 4A.

FIGS. 4A and 4B show one of cups 24 of packing case 20. FIG. 4A provides a fragmented peripheral edge view of cup 24, and FIG. 4A provides a cross-sectional view of cup 24. Three cups 24 are used in packing case 20, as shown in FIG. 1. As seen from the drawings, cup 24 is substantially similar to nose cup 22. However, cup 24 includes channels 40 that only run lengthwise within cup 24 rather than circumferentially as in nose cup 22. Channels 40 of cup 24 are, preferably, circular in cross-section and, intersect with channels 40 of nose cup 22, other cups 24, and/or end cup 26, as shown in FIG. 1. The channels 40 of the three cups 24, as well as channels 40 of nose cup 22 and end cup 26, intersect as shown so that liquid coolant may flow in substantially parallel passageways 52 along the length of packing case 20 and rod 50, as described above and shown in FIG. 2. O-rings 46 provide a seal where channels 40 of cup 24 meet and intersect with channels of other cups in the packing case. As shown in FIG. 4B, o-rings 46 have a kidney-shape designs that is well known to those skilled in the art.

Figure 5A:
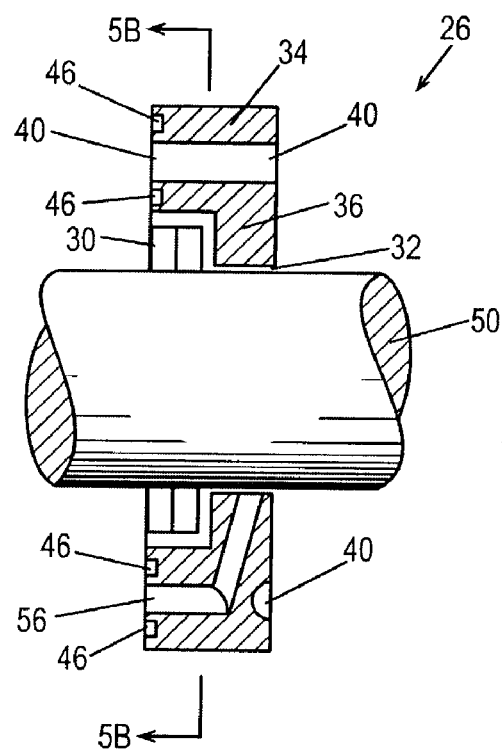
FIG. 5A shows a fragmented peripheral edge view of an end cup of the packing case of FIG. 1.
Figure 5B:
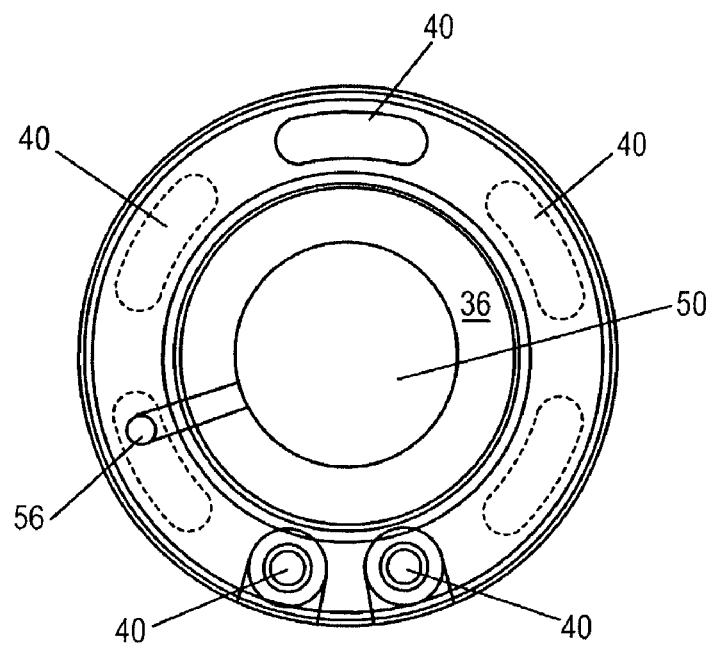
FIG. 5B shows a cross-sectional view of an end cup of the packing case of FIG. 1 as viewed along cross-section lines 5B—5B of FIG. 5A.

FIGS. 5A and 5B show end cup 26 of packing case 20. FIG. 5A provides a fragmented peripheral edge view of end cup 26, and FIG. 5B provides a cross-sectional view of end cup 26. End cup 26 is substantially similar to the other cups in packing case 20. End cup 26 may include includes channels 40 that run both lengthwise and circumferentially within end cup 26. Circumferential portions of channels 40 are similar to those described above in nose cup 22, their purpose being to circulate coolant from one of the substantially parallel passageways of packing case 20 to the series connected next substantially parallel passageway. Optionally, end cup 26 may include an opening or vent 56 that provides a vent to the outside of packing case 20. The addition of and use of such a vent or opening in packing case 20 is well understood by those skilled in the art, and end cup 26 may sometimes be referred to as a vent cup.

Figure 6A:
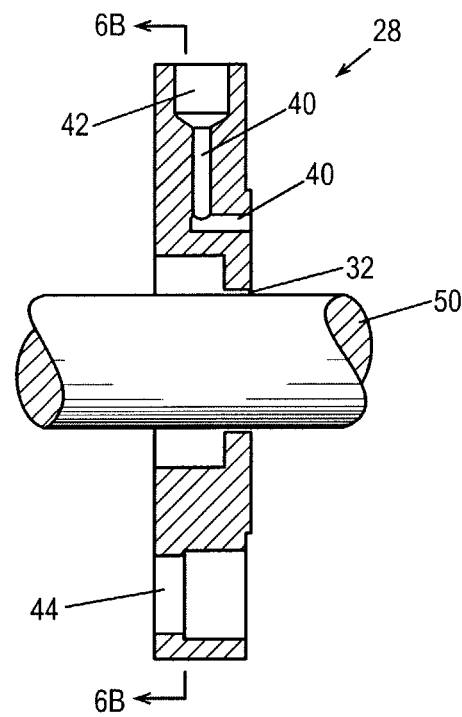
FIG. 6A shows a fragmented peripheral edge view of a flange of the packing case of FIG. 1.
Figure 6B:
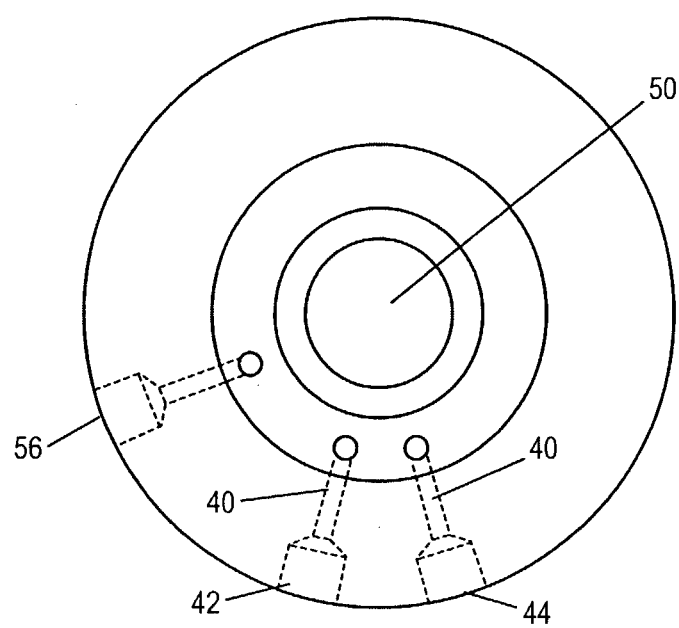
FIG. 6B shows a cross-sectional view of a flange of the packing case of FIG. 1 as viewed along cross-section lines 6B—6B of FIG. 6A.

FIGS. 6A and 6B show flange 28 of packing case 20. FIG. 6A provides a fragmented peripheral edge view of flange 28, and FIG. 6B provides a cross-sectional top view of flange 28. As can be seen in FIG. 1, flange 28 is wider than cups 22, 24, and 26 of packing case 20. Flange 28 includes inlet port 42 and outlet port 44. From inlet port 42, a first channel 40 of flange 28 leads to and a channel 40 of end cup 26. Similarly, another channel 40 of end cup 26 meets and intersects with a second channel 40 of flange 28 that leads to outlet port 44. Coolant enters packing case 20 through inlet port 42 and flows through packing case 20, as shown in FIGS. 1 and 2, until the coolant reaches outlet port 44 and exits packing case 20.

Figure 8:
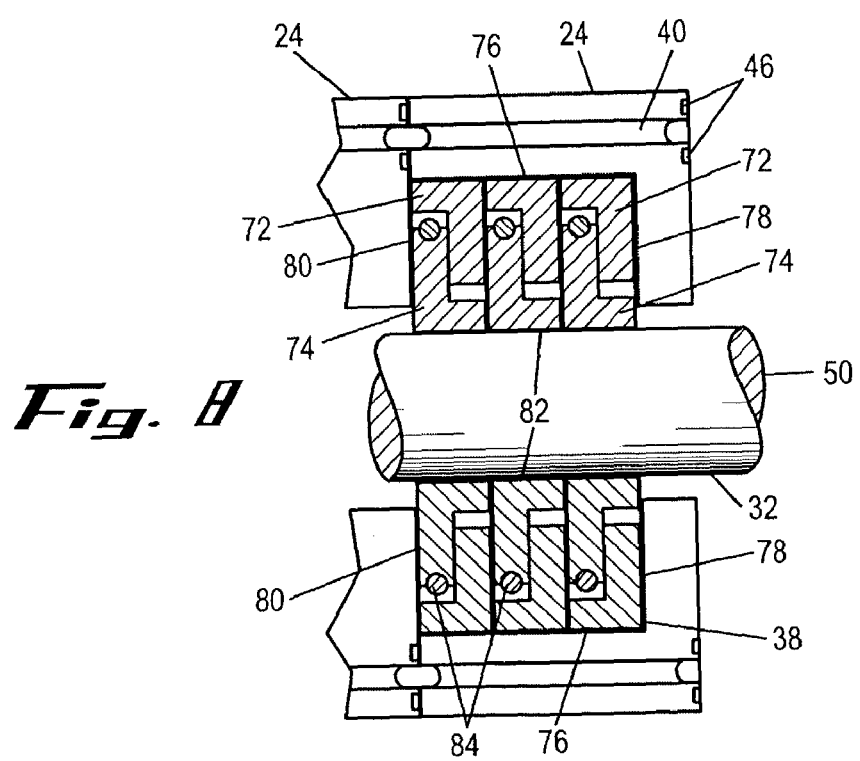
FIG. 8 is a fragmented peripheral edge view of a cup and heat transfer rings of the packing case of FIG. 7.

FIGS. 7 and 8 depict a portion of a packing case, including cups 24, in which heat transfer rings are used rather than conventional seal rings. It should be understood that heat transfer rings according to the present invention may be used with packing cases according to the present invention or other existing packing cases. For simplicity, FIGS. 7 and 8 show heat transfer rings 70 in a portion of a packing case including cups 24 that is otherwise the same as the packing case of FIG. 1, except that heat transfer rings 70 are used rather than seal rings 30. The use of heat transfer rings according to the present invention provides additional heat transfer from the surface of the rod to the packing case.

As shown in FIGS. 7 and 8, heat transfer rings 70 include alternating outer rings 72 and inner rings 74. Outer rings 72 contact a surface 76 of cup 24. Inner rings 74 contact a surface 82 of rod 50. Outer rings 72 and inner rings 74 contact each other as shown, and may be held together by springs 84 or any other suitable means, as well understood by those skilled in the art While the exemplary embodiment in FIGS. 7 and 8 shows three outer rings 72 and three inner rings 74, it should be understood that more or less outer and inner rings may be used as desired, typically dependent on the amount of space between the cups of the packing case and the rod on which the packing case is disposed. The same number of each type of ring, outer and inner, should be used in the manner shown to provide an alternating pattern.

As noted above in connection with FIG. 1, typically, conventional seal rings 30 contact the surface of rod 50 and the surface of an adjacent packing cup or flange, as shown in FIG. 1, but not the two surfaces of an annular recess 38 within which the seal rings are disposed. In contrast to conventional seal rings 30, heat transfer rings 70 contact both surfaces 76 and 78 of annular recess 38, as well as a surface 80 of an adjacent packing cup or flange and surface 82 of rod 50, as shown in FIGS. 7 and 8. The four contact surfaces 76, 78, 80, and 82 allow for more extensive heat transfer from rod 50 to the packing case than provided by conventional seal rings, where typically only two contact surfaces are present.

Suitable materials for heat transfer rings 70 include bronze, aluminum, graphite filled polymer, or other high heat transferring materials. Outer rings 72 may be solid, uncut rings or cut rings, such as a cut jointed piston ring, which are well known to those skilled in the art. Outer rings 72 are similar in size and shape to standard piston rings. A solid ring fits snugly, while a cut ring provides outward tension for good contact and heat transfer. Inner rings 74 may be segmental rings, which are rings cut into segments and similar to standard radial or tangential seal rings, which are well known to those skilled in the art, in size and shape. A segmental ring contacts the rod with an inward applied force by the spring to assure good contact and heat transfer.

Figure 10:
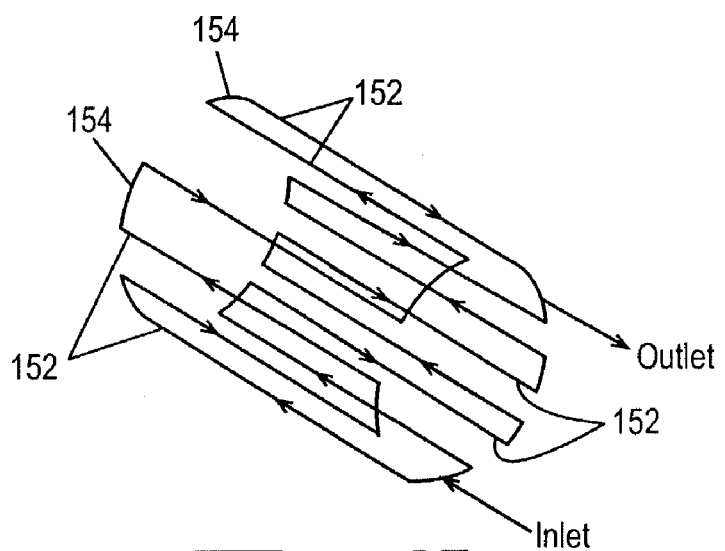
FIG. 10 shows a flow pattern for a fluid coolant circulated through the packing case shown in FIG. 9.

Referring now to FIGS. 9 and 10, an alternative embodiment of a packing case according to the present invention is shown. A packing case 120 is disposed on a piston rod 150. Packing case 120 includes a nose cup 122, a series of five cups 124, an end cup 126, and a flange 128. Cups 122, 124, and 126 and flange 128 may be constructed of steel, cast iron, bronze, or other suitable materials provided that the material meets the chemical resistance and mechanical strength requirements for a particular application, as well understood by those skilled in the art.

Cups 122, 124, and 126 and flange 128 are substantially similar to the packing cups and flange described above and shown in FIGS. 3A–6B, as well understood by those skilled in the art. Slight modifications are desirable, particularly to flange 128 and end cup 126, to provide the necessary configuration for multiple inlet and outlet ports and the split flow arrangement shown in FIGS. 9 and 10, such modifications being well understood by those skilled in the art. Also understood by those skilled in the art is that the number of packing cups contained in any given packing case is a matter of conventional design choice, as noted above.

Conventional seal rings 130 are disposed around the surface of piston rod 150 and within annular recesses 138, and perform in the manner and may be made from the same materials as described above in connection with FIG. 1. In an alternative embodiment, heat transfer rings according to the present invention may be used rather than conventional seal rings.

Coolant channels 140 of each of cups 122, 124 and 126 and flange 128 provide a beneficial coolant flow pattern for packing case 120 to assist in cooling piston rod 150. In the embodiment shown in FIGS. 9 and 10, the liquid coolant flows in a split flow arrangement rather than the single, continuous path flow described above and shown in FIGS. 1 and 2. The formation of substantially parallel passageways 152 and circumferential passageways 154 by channels 140 and/or the connection of channels 140 of cups 122, 124, and 126 and flange 128 is the same as described above with regard to FIGS. 1–6B, except that a first channel 140 from flange 128 intersects a circumferential portion of a channel 140 of end cup 126 such that the coolant flow is split into two separate paths, as shown in FIG. 10. In each of the two paths, the coolant flows through substantially parallel passageways 152 and circumferential passageways 154 around half of the circumference of packing case 120 before exiting the packing case. This split flow arrangement provides greater cooling capacity and more uniform cooling than the single, continuous flow path described above and shown in FIGS. 1 and 2. The cooling is more uniform because the coolant only flows around 50% of the packing case rather than the entire packing case. As such, a split flow arrangement is preferable to a single, continuous flow path. Additionally, other multiple flow path arrangements may be possible, and this invention is not limited to a one or two path flow arrangement. A further modification widening the channels of the flange such that the two split paths may be supplied an adequate amount of coolant to effectively double the total amount of flow is also possible.

Although not necessary for a split flow arrangement, the embodiment of FIG. 9 includes two inlet ports 142 and 143 and two outlet ports 144 and 145 in the flange of the packing case, rather than a single inlet port and single outlet port. O-rings 146 are used between adjoining cups of packing case 120 where channels 140 of the cups meet, as shown in FIG. 9. A gasket press 148 is used adjacent to nose cup 122.

The foregoing description of the exemplary embodiments of the invention has been presented only for the purposes of illustration and description and is not intended to be exhaustive or to limit the invention to the precise forms disclosed. Many modifications and variations are possible in light of the above teaching. For example, the outer surface of cups 22, 24, 26, 122, 124, and 126 and flanges 28 and 128 need not necessarily be cylindrical, although such construction is preferred. They could, for example, be of rectangular or some other polygonal shape.

The embodiments were chosen and described in order to explain the principles of the invention and their practical application so as to enable others skilled in the art to utilize the invention and various embodiments and with various modifications as are suited to the particular use contemplated. Alternative embodiments will become apparent to those skilled in the art to which the present invention pertains without departing from its spirit and scope. Accordingly, the scope of the present invention is defined by the appended claims rather than the foregoing description and the exemplary embodiments described therein.

What is claimed is:

1. A packing case defining an opening through which a movable machinery shaft may be inserted such that the packing case is mounted on the shaft, the packing case comprising:
   a plurality of packing cups with each cup having channels through which a fluid coolant may flow, the channels forming substantially parallel passageways extending through all of the plurality of cups along the length of the shaft with the passageways being spaced apart around the shaft circumference and series connected; and
   a flange with at least one inlet port connected to a first channel of the flange and at least one outlet port connected to a second channel of the flange, the first and second channels of the flange each intersecting a channel of one of the plurality of packing cups such that the fluid coolant may be introduced through the at least one inlet port, circulate through the substantially parallel passageways of the plurality of packing cups, and exit the packing case through the at least one outlet port.

2. The packing case of claim 1, wherein the fluid coolant circulates in a single, continuous path in the substantially parallel passageways before exiting the packing case.

3. The packing case of claim 1, wherein the first channel of the flange intersects a channel of one of the plurality of packing cups such that the fluid coolant flow is split and the fluid coolant circulates in two paths through the substantially parallel passageways before exiting the packing case.

4. A packing case defining an opening through which a movable machinery shaft may be inserted such that the packing case is mounted on the shaft, the packing case comprising:
   a plurality of packing cups, each packing cup with channels through which a fluid coolant may flow and that are connected to channels of adjacent packing cups to form substantially parallel passageways along the length of the shaft that are spaced apart around the shaft circumference and series connected; and
   a flange comprising more than one inlet port and more than one outlet port with at least one inlet port connected to a first channel of the flange and at least one outlet port connected to a second channel of the flange, the first and second channels of the flange intersecting separate channels of an adjacent packing cup of the plurality of packing cups such that the fluid coolant may be introduced through the at least one inlet port, circulate through the substantially parallel passageways of the plurality of packing cups, and exit the packing case through the at least one outlet port.

5. The packing case of claim 4, wherein the fluid coolant circulates in a single, continuous path in the substantially parallel passageways before exiting the packing case.

6. The packing case of claim 4, wherein the first channel of the flange intersects a channel of the adjacent packing cup such that the fluid coolant flow is split and the fluid coolant circulates in two paths through the substantially parallel passageways before exiting the packing case.

7. The packing case of claim 4, wherein the plurality of packing cups includes a nose cup and an end cup and the channels of the nose and end cups form circumferential passageways that series connect the substantially parallel passageways.

8. The packing case of claim 7, wherein the end cup is adjacent the flange such that each of the first and second channels of the flange connect to separate channels of the end cup.

9. The packing case of claim 4, further comprising o-rings disposed between each of the plurality of packing cups and one of the plurality of packing cups and the flange where channels of each of the plurality of packing cups and the flange connect.

10. The packing case of claim 4, further comprising a plurality of heat transfer rings disposed around the surface of the shaft.

11. A packing case defining an opening through which a movable machinery shaft may be inserted such that the packing case is mounted on the shaft, the packing case comprising:
   a plurality of packing cups, each packing cup having an annular shape and including:
      an outer portion that is longer than an inner portion, forming an annular recess for receiving one or more rings; and
      channels through which a fluid coolant may flow and that are connected to channels of adjacent packing cups to form substantially parallel passageways extending through all of the plurality of cups along the length of the shaft with the passageway being spaced apart around the shaft circumference and series connected; and
   a flange with at least one inlet port connected to a first channel of the flange and at least one outlet port connected to a second channel of the flange, the first and second channels of the flange connected to separate channels of an adjacent packing cup of the plurality of packing cups such that the fluid coolant may be introduced through the at least one inlet port, circulate through the substantially parallel passageways of the plurality of packing cups, and exit the packing case through the at least one outlet port.

12. The packing case of claim 11, wherein the channels in each packing cup are located only within the outer portion of the packing cup.

13. The packing case of claim 11, further comprising a plurality of seal rings disposed around the surface of the shaft and in the annular recess of each of the plurality of packing cups.

14. The packing case of claim 11, further comprising a plurality of heat transfer rings disposed around the surface of the shaft and in the annular recess of each of the plurality of packing cups, wherein a set of heat transfer rings disposed within an annular recess includes at least one outer ring and at least one inner ring in contact with each other.

15. The packing case of claim 14, wherein the heat transfer rings include more than one outer ring and more than one inner ring, the outer rings and inner rings in alternating contact with each other, the outer rings comprising solid or cut rings, and the inner rings comprising segmental rings.

16. The packing case of claim 14, wherein each set of heat transfer rings contacts both surfaces of the annular recess and a surface of an adjacent packing cup or flange.

* * * * *